(12) United States Patent
Burney et al.

(10) Patent No.: US 6,981,206 B1
(45) Date of Patent: Dec. 27, 2005

(54) METHOD AND APPARATUS FOR GENERATING PARITY VALUES

(75) Inventors: Ali Burney, Fremont, CA (US); Nitin Prasad, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 522 days.

(21) Appl. No.: 10/315,501

(22) Filed: Dec. 10, 2002

(51) Int. Cl.[7] .............................................. G06F 11/00
(52) U.S. Cl. ..................................... 714/801; 714/807
(58) Field of Search .............................. 714/801, 807, 714/800, 755, 758

(56) References Cited

U.S. PATENT DOCUMENTS 4,295,219 A * 10/1981 Draper et al. ............... 714/805
4,314,350 A * 2/1982 Toy ............................. 708/533
5,835,511 A * 11/1998 Christie ....................... 714/802
6,742,159 B2 * 5/2004 Sakurai ....................... 714/801

* cited by examiner

Primary Examiner—Phung My Chung
(74) Attorney, Agent, or Firm—L. Cho

(57) ABSTRACT

A circuit for computing parity values is disclosed. The circuit includes a control decode unit. The control decode unit determines whether words received during a cycle correspond to more than one packet of data. The circuit includes a first parity processor. The first parity processor computes first parity sum values from first words associated with a first packet of data received during the cycle. The circuit includes a second parity processor. The second parity processor is capable of computing second parity sum values from second words associated with a second packet of data received during the cycle when the control decode unit determines that the data words correspond to more than one packet of data.

21 Claims, 9 Drawing Sheets

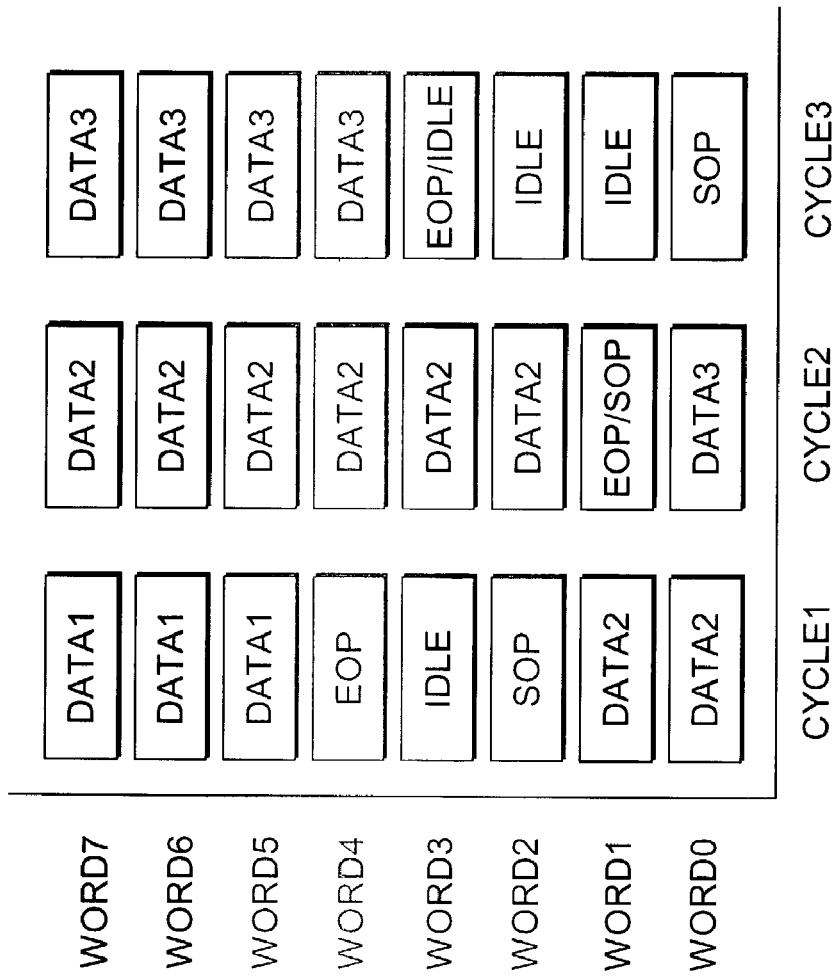

METHOD AND APPARATUS FOR GENERATING PARITY VALUES

FIELD OF THE INVENTION

The present invention relates to the generation of parity values. More specifically, the present invention relates to a method and apparatus for generating diagonal interleaved parity-4 (DIP-4) parity bits according to the System Packet Interface Level 4 (SPI-4) Phase 2 specification.

BACKGROUND

SPI-4 is an interface for packet and cell transfer between a physical layer (PHY) device and a link layer device for aggregate bandwidths of OC-192 ATM, Packet over SONET/SDH (POS), as well as 10 Gb/s Ethernet applications. SPI-4 is a 16-bit interface based on low voltage differential signaling (LVDS) I/O, running at a minimum of 622 Mbits/sec. The SPI-4 interface provides in-band control and out-of-band status channel for flow control. The status channel is implemented as a 2-bit wide status bus that provides per-channel receiver status in a weighted round-robin fashion. The in-band control indicates channel address, start and end of packet, and checksum.

The data and status paths are accompanied by clock signals. Source synchronous clocking is used in which the data path is clocked on both rising and falling edges of the clock signal. The data path is based on a dual-data-rate scheme. SPI-4 includes training patterns that enable the design of dynamically aligned de-skew mechanisms.

SPI-4 supports simultaneous transfer of multiple protocols by using a simple control protocol to decouple interface operation from the actual data being transferred. SPI-4 uses in-band control words (payload, idle, and training control words) that are inserted between data transfer. Each SPI-4 data transfer is preceded by a payload control word that indicates the port address, a start-of-packet indicator, and an error control code based on DIP-4.

Computing DIP-4 parity bits requires circuitry that performs a series of XOR operations. Approaches used in the past for summing diagonally the words used in computing DIP-4 parity bits failed to meet the required performance target of SPI-4 of 105 MHz.

Thus what is needed is an efficient and cost effective method and apparatus for computing DIP-4 parity bits.

SUMMARY

A circuit for computing parity values such as DIP-4 parity bits for packets of data is disclosed. The circuit utilizes a plurality of processors for generating parity sum values that are utilized for generating parity values. In instances where words from more than one packet of data are received during a cycle, parity sum values for the packets of data may be generated concurrently in separate processors in order to increase efficiency.

A circuit for computing parity values is disclosed according to a first embodiment of the present invention. The circuit includes a control decode unit. The control decode unit determines whether words received during a cycle correspond to more than one packet of data. The circuit includes a first parity processor. The first parity processor computes first parity sum values from first words associated with a first packet of data received during the cycle. The circuit includes a second parity processor. The second parity processor is capable of computing second parity sum values from second words associated with a second packet of data received during the cycle when the control decode unit determines that the data words correspond to more than one packet of data.

A circuit for computing parity values is disclosed according to a second embodiment of the present invention. The circuit includes a first parity processor having a first stage first parity processor. The first stage first parity processor includes a plurality of first parity processor first circuits coupled in series. Each of the plurality of first parity processor first circuits generates a first parity result from a consecutive word received during a cycle and an output from a previous first parity processor first circuit in the series or a first parity result from a previous cycle. The first parity processor includes a second stage first parity processor. The second stage first parity processor includes a plurality of first parity processor second circuits. Each of the plurality of first parity processor second circuits correspond to one of the plurality of first parity processor first circuits. Each of the plurality of first parity processor second circuits generates a first parity sum value from a first parity result from a corresponding first circuit and a corresponding next word. The circuit includes a first selector. The first selector identifies one of the first parity sum values as the parity value of a first packet in response to a signal indicating which of the words represents an end of the first packet.

A method for computing parity values is disclosed according to an embodiment of the present invention. First parity results are generated from words received during a cycle and a previously generated parity result. First parity sum values are generated from the first parity results and a corresponding next word. One of the first parity sum values is identified as a parity value of a first packet in response to a signal indicating which of the data words represents an end of the first packet.

BRIEF DESCRIPTION OF THE DRAWINGS

The features and advantages of the present invention are illustrated by way of example and are by no means intended to limit the scope of the present invention to the particular embodiments shown, and in which:

FIG. 9 illustrates exemplary data and control transitions processed by a parity value processor according to an embodiment of the present invention.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be single signal lines, and each of the single signal lines may alternatively be buses.

Figure 1:
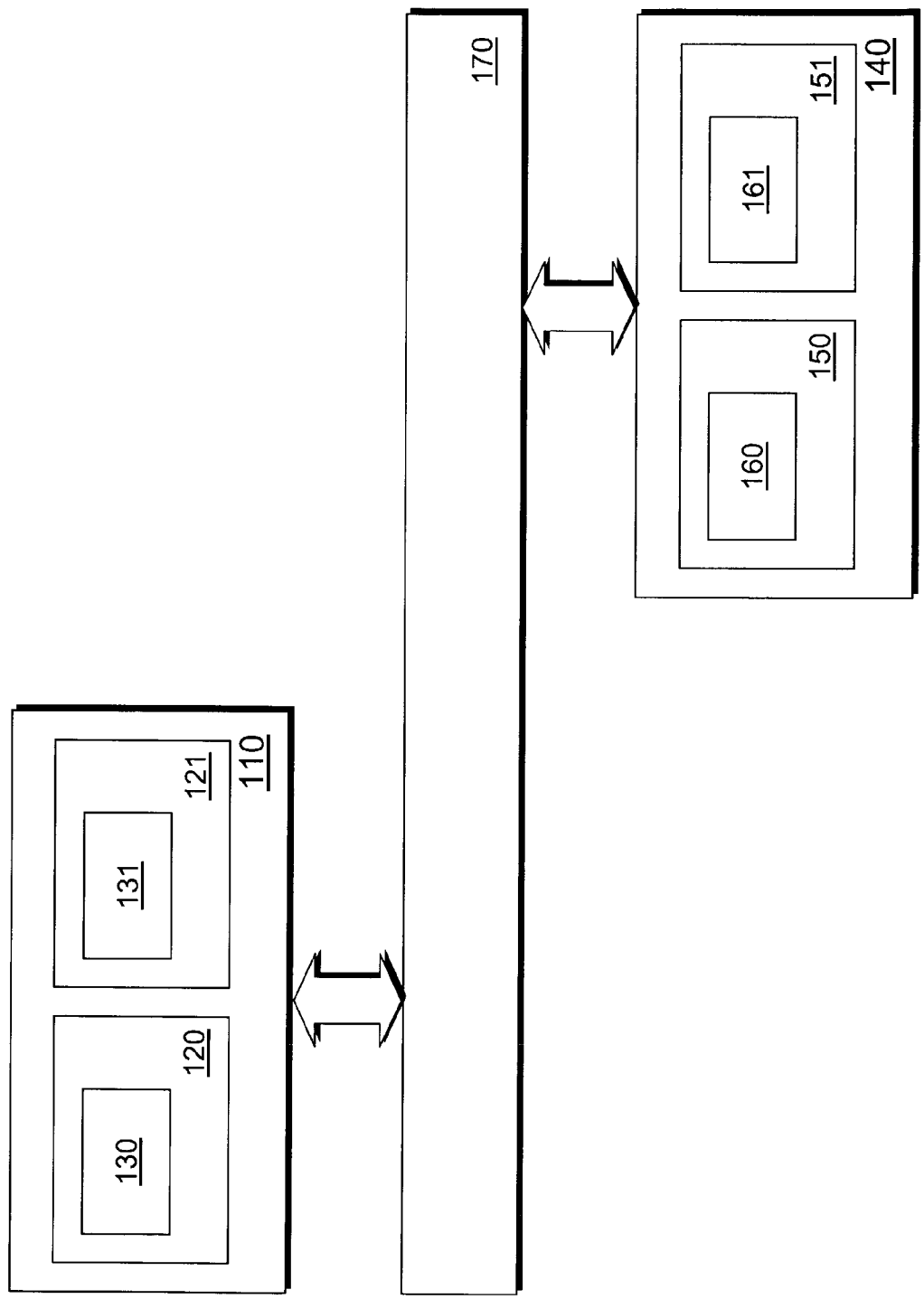
FIG. 1 is a block diagram of a network implementing an embodiment of the present invention.

FIG. 1 is a block diagram illustrating a communication network 100 according to an embodiment of the present invention. The communication network 100 includes a first network component 110 and a second network component 140. According to an embodiment of the communication network 100, the first network component 110 and the second network component 140 may both operate to transmit and receive data. The first network component 110 may be, for example, a physical layer (PHY) device having a transmit layer 120 and a receive layer 121. The second network component 140 may be, for example a link layer device having a transmit layer 150 and a receive layer 151. The first network component 110 and second network component 140 may utilize the System Packet Interface Level 4 (SPI-4) Phase 2 interface for transferring packets and cells having aggregate bandwidths of OC-192 ATM, Packet over SONET/SDH (POS), as well as 10 Gb/s Ethernet applications.

The first network component 110 and the second network component 120 are coupled to a transmission medium 170. According to an embodiment of the network 100, the transmission medium may include data buses, control buses, and other transmission links between components in the network 100. In this embodiment, the transmission medium 170 includes a data bus and a control bus connecting the transmit link layer 120 of the first network component 110 and the receive link layer 151 of the second network component 140. Similarly, the transmission medium 170 includes a data bus and a control bus connecting the transmit link layer 150 of the second network component 140 and the receive link layer 121 of the first network component 110.

Each of the transmit and receive layers of the first and second network components 110 and 140 includes a parity value processor. A parity value processor 130 in the transmit layer 120 of the first network component 110 operates to generate a parity value from data and control words to be transmitted by the transmit layer 120 onto the network 100. A parity value processor 131 in the receive layer 121 of the first network component 110 operates to generate a parity value from data and control words received by the receive layer 121 from the network 100. Similarly, parity value processor 160 in the transmit layer 150 of the second network component 140 operates to generate a parity value from data and control words to be transmitted by the transmit layer 150 onto the network 100. Parity value processor 161 in the receive layer 151 of the second network component 140 operates to generate a parity value from data and control words received by the receive layer 151 from the network 100. Whether transmission errors are present is determined by comparing the parity values received with the data and control words with parity values calculated from the data and control words.

According to an embodiment of the present invention, the parity value processors generate parity values by computing diagonal interleaved parity (DIP-4) parity bits. DIP-4 parity bits are computed for each packet transmitted through the network 100. A packet may include any number of data words that may be sandwiched between two payload control words. In an embodiment where n words may be received or transmitted every time cycle (cycle), and the n words may include words from more than one packet, the parity value processors may begin processing the DIP-4 parity bits for both packets concurrently.

Figure 2:
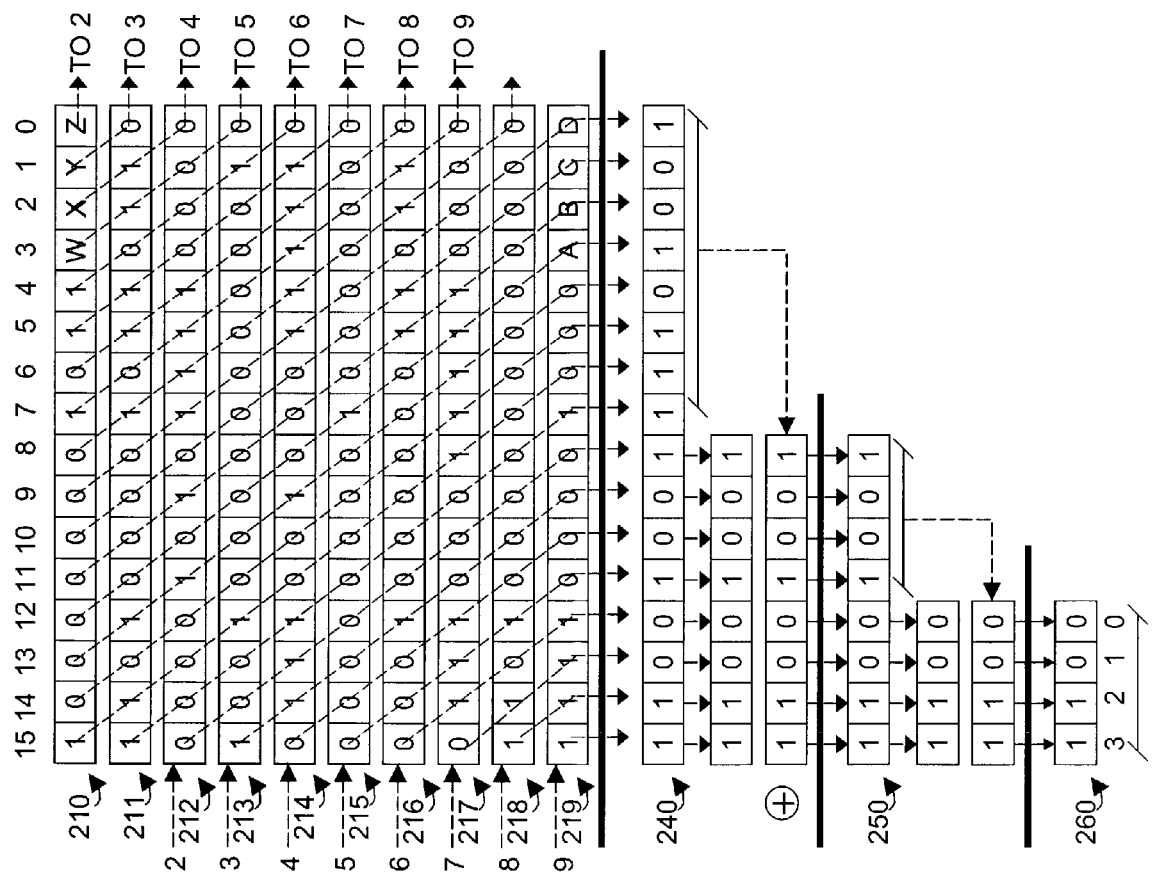
FIG. 2 is a diagram illustrating the computation of DIP-4 parity bits according to an embodiment of the parity value processor.

FIG. 2 is a diagram illustrating an example of how DIP-4 parity bits are computed according to an embodiment of a parity value processor. In this example, ten 16-bit words 210–219 are in a packet received by a parity value processor. The ten words include eight data words, and two payload control words. The words are listed in the order received, from the earliest on the top to the latest on the bottom. The words include data words 211–218 and payload control words 210 and 219. The first payload control word 210 received in the packet is not used in computing the DIP-4 parity bits. The last four values of the last payload control word 219 received in the packet, indicated as A, B, C, and D, are set to 1s. A parity sum is generated by summing diagonally values in the data words 212–218 and the last payload control word 219. The values to be summed together are shown with the dashed lines. Since there are 9 words to be summed together, each term in the parity sum is generated by the sum of 9 values. The summed values generate a 16-bit parity sum 240. The summing may be achieved by performing an XOR function on the values along the dashed lines.

The 16-bit parity sum 240 is split into two bytes, which are added to each other modulo-2 to produce an 8-bit parity sum 250. The 8-bit parity sum 250 is then split into two 4-bit nibbles, which are added to each other modulo-2 to produce the final DIP-4 parity bits 260. This procedure may be used to generate parity values on an egress path or to check parity on an ingress path.

Figure 3:
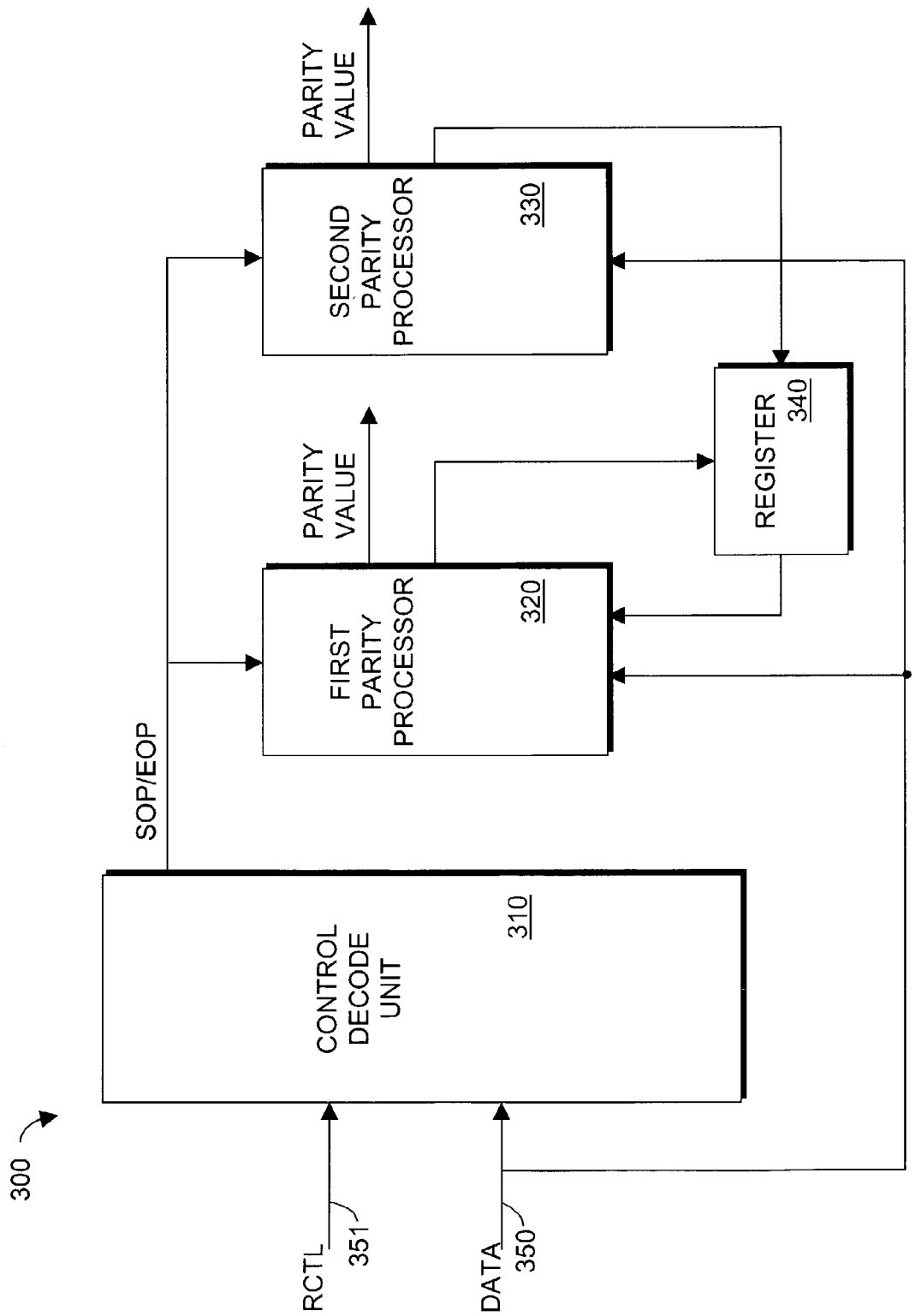
FIG. 3 is a block diagram of a parity value processor according to an embodiment of the present invention.

FIG. 3 is a block diagram of a parity value processor 300 according to an embodiment of the present invention. The parity value processor 300 includes a control decode unit 310. The control decode unit 310 is coupled to a data bus 350 and a control bus 351. The data bus 350 may be used to transmit words such as data words, payload control words, training data words, training control words, idle words, or other words. According to an embodiment of the network 100 (shown in FIG. 1), the words may include 8 16-bit words that have been serialized from a 128-bit stream during a cycle. The words may be given a designated order from lowest to highest, where the first through eighth word received in the time cycle are designated as having orders zero through seven respectively. The control bus 351 may be used to transmit control information. The control information may be used to identify which if any of the 8 words on the data bus 350 during a cycle includes payload control words that indicate the start of a packet of data or an end of a packet of data.

According to an embodiment of the parity value processor 300, the control decode unit 310 generates an 8-bit start of packet (SOP) value that identifies which, if any, of the 8 words in a time cycle is a start of a new packet of data. The control decode unit 310 also generates an 8-bit end of packet (EOP) value that identifies which, if any, of the 8 words in a time cycle is an end of a packet of data. In this embodiment, the control decode unit 310 may determine that a word is a start of a packet when the control information indicates that the word is a control word, and the thirteenth and fifteenth bit of the word are high (has a value of 1). Thus for a word x, this may be achieved by performing an AND function between the values rctl[x], wordx[15], and wordx[12]. The control decode unit 310 may determine that a word is an end of a packet when the fifteenth bit of the word is high (has a value of 1).

The parity value processor 300 includes a first parity processor 320. The first parity processor 320 is coupled to the control decode unit 310 and the data bus 350. The first parity processor 320 receives words from the data bus 350 and SOP and EOP values from the control decode unit 310. From the SOP and EOP values, the first parity processor 320 determines which if the words received during a time cycle corresponds to a first packet of data and which, if any, of the data words received corresponds to a second packet of data. In the case where the first parity processor 320 receives all the words of the first packet of data during a time cycle, the first parity processor 320 generates a parity value for the first packet of data. In the case where not all of the words of the first packet of data are received during the time cycle (no EOP is received with respect to the first packet of data), the first parity processor 320 generates a first parity result for the data words of the first packet and stores the first parity result in a register 340. The value stored in the register 340 is used by the first parity processor 320 during the next time cycle as it continues to process data words received in the next time cycle. If the last word for the first packet of data is received during the next time cycle, as indicated by an EOP value, the first parity processor 320 generates a parity value for the first packet of data. However, if not all the words of the first packet of data are received during the next time cycle, the first parity processor 320 generates another first parity result for the words of the first packet and stores the first parity result in the register 340 for use in the time cycle after next. This process continues until the last word of the first packet of data is received.

The parity value processor 300 includes a second parity processor 330. The second parity processor 320 is coupled to the control decode unit 310 and the data bus 350. The second parity processor 320 receives the words from the data bus 350 and SOP and EOP values from the control decode unit 310. From the SOP and EOP values, the first parity processor 320 determines which if the data words received during a time cycle corresponds to a first packet of data and which, if any, of the data words received corresponds to a second packet of data. In the case where the second parity processor 330 receives all the words of the second packet of data during a time cycle, the second parity processor 330 generates a parity value for the second packet of data. In the case where not all of the words of the second packet of data are received during the time cycle (no EOP is received with respect to the second packet of data), the second parity processor 330 generates a second parity result for the words of the second packet and stores the second parity result in the register 340. The value stored in the register 340 is used by the first parity processor 320 during the next time cycle to process words received in the next time cycle. If the last word for the second packet of data is received during the next time cycle, as indicated by an EOP value, the first parity processor 320 generates a parity value for the second packet of data. However, if not all words of the second packet of data are received during the next time cycle, the first parity processor 320 generates another second parity result for the words of the first packet and stores the second parity result in the register 340 for use in the time cycle after next. This process continues until the last word of the second packet of data is received.

It should be appreciated that parity value processor 300 may include any number of parity processors for processing parity values for any number of packets of data concurrently. In an embodiment of the present invention where the parity value processor 300 is used to process DIP-4 parity bits for SPI-4, two parity processors may be sufficient. In SPI-4, there is segmentation of data in multiples of 8 words (16 bytes) per time cycle, where a maximum of two packets of data is transmitted within 8 words. Thus, because only two packets of data, at most, can be transmitted during a time cycle, two parity processors per network component may be sufficient for efficiently computing DIP-4 parity bits.

Figure 4:
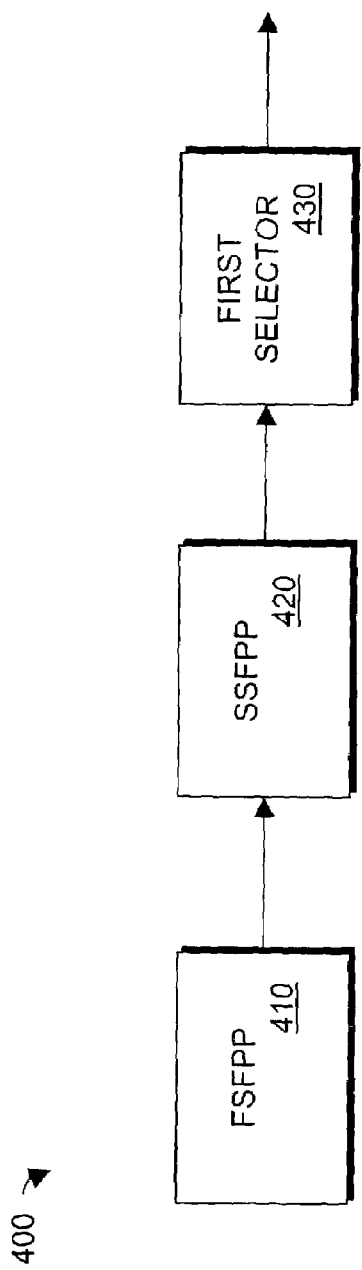
FIG. 4 is a block diagram of a first parity processor that may be used to implement the first parity processor shown in FIG. 3 according to an embodiment of the present invention.

FIG. 4 is a block diagram of a first parity processor 400 according to an embodiment of the present invention. The first parity processor 400 may be used to implement the first parity processor 320 shown in FIG. 3. The first parity processor 400 includes a first stage first parity processor (FSFPP) 410. The first stage first parity processor 410 includes a plurality of first parity processor first circuits (not shown) coupled in series. Each of first parity processor first circuits receives one of the words on the data bus 350 (shown in FIG. 3). Each of first parity processor first circuits, with the exception of the first first parity processor first circuit in the series, generates a first parity result from the word and an output from a previous first parity processor first circuit in the series. The first first parity processor first circuit in the series generates a first parity result from a word received from the data bus 350 and parity result from a previous time cycle. If the current time cycle is a first time cycle for processing a packet of data, the value from the parity result from the previous time cycle is zero.

The first parity processor 400 includes a second stage first parity processor (SSFPP) 420. The second stage first parity processor 420 includes a plurality of first parity processor second circuits (not shown), each corresponding to one of first parity processor first circuits. Each of the plurality of first parity processor second circuits generates a first parity sum value from a first parity result from a corresponding first parity processor first circuit and a corresponding next word. In one embodiment, the first first parity processor second circuit corresponds to a last first parity processor first circuit in the series. In this embodiment, the first first parity processor second circuit receives a first parity result generated from the first parity processor first circuit generated in a previous time cycle. The corresponding next word received by the first first parity processor second circuit is the first word on the data bus 350 during the present time cycle.

The first parity processor 400 includes a first selector that identifies one of the first parity sum values as the parity value of a first packet in response to a signal indicating which of the words represents an end of the first packet.

Figure 5:
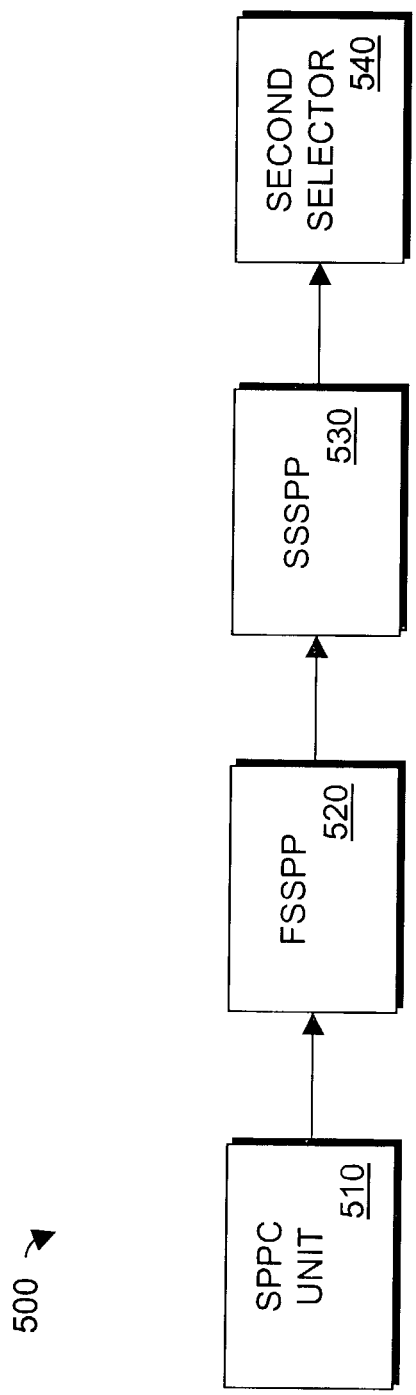
FIG. 5 is a block diagram of a second parity processor that may be used to implement the second parity processor shown in FIG. 3 according to an embodiment of the present invention.

FIG. 5 is a block diagram of a second parity processor 500 according to an embodiment of the present invention. The second parity processor 500 may be used to implement the second parity processor shown in FIG. 3. The second parity processor 500 includes a second parity processor calibration (SPPC) unit 510. The second parity processor calibration unit 510 operates to calibrate the second parity processor 700 such that its parity results only take into account words associated with the second packet of data. The second parity processor calibration unit 510 includes a plurality of multiplexers (not shown). Each of the multiplexers receive a word received during the cycle. Each of the plurality of multiplexers outputs either its received data word or a zero value in response to a signal indicating whether one of the data words represents a start of a second packet.

The second parity processor 500 includes a first stage second parity processor (FSSPP) that includes a plurality of second parity processor first circuits (not shown) coupled in series. Each of the plurality of second parity processor first circuits is coupled to at least one of the plurality of multiplexers from the SPPC unit 510. Each of the plurality of second parity processor first circuits, with the exception of the first second parity processor first circuit, generates a second parity result from an output of a corresponding multiplexer and an output from a previous second parity processor first circuit in the series. The first second parity processor first circuit generates a second parity result from outputs of a first and second multiplexer in the SPPC unit 510.

The second parity processor 500 includes a second stage second parity processor (SSSPP) 530 that includes a plurality of second parity processor second circuits (not shown). Each of the second parity processor second circuits corresponds to one of the plurality of second parity processor first circuits. Each of the plurality of second parity processor second circuits generates a second parity sum value from a second parity result from a corresponding second parity processor first circuit and a corresponding next data word of the corresponding first circuit.

The second parity processor 500 includes a second selector 540. The second selector 540 identifies one of the second parity sum values as a parity value of a second packet in response to a signal indicating which of the words represents an end of the second packet.

Figure 6:
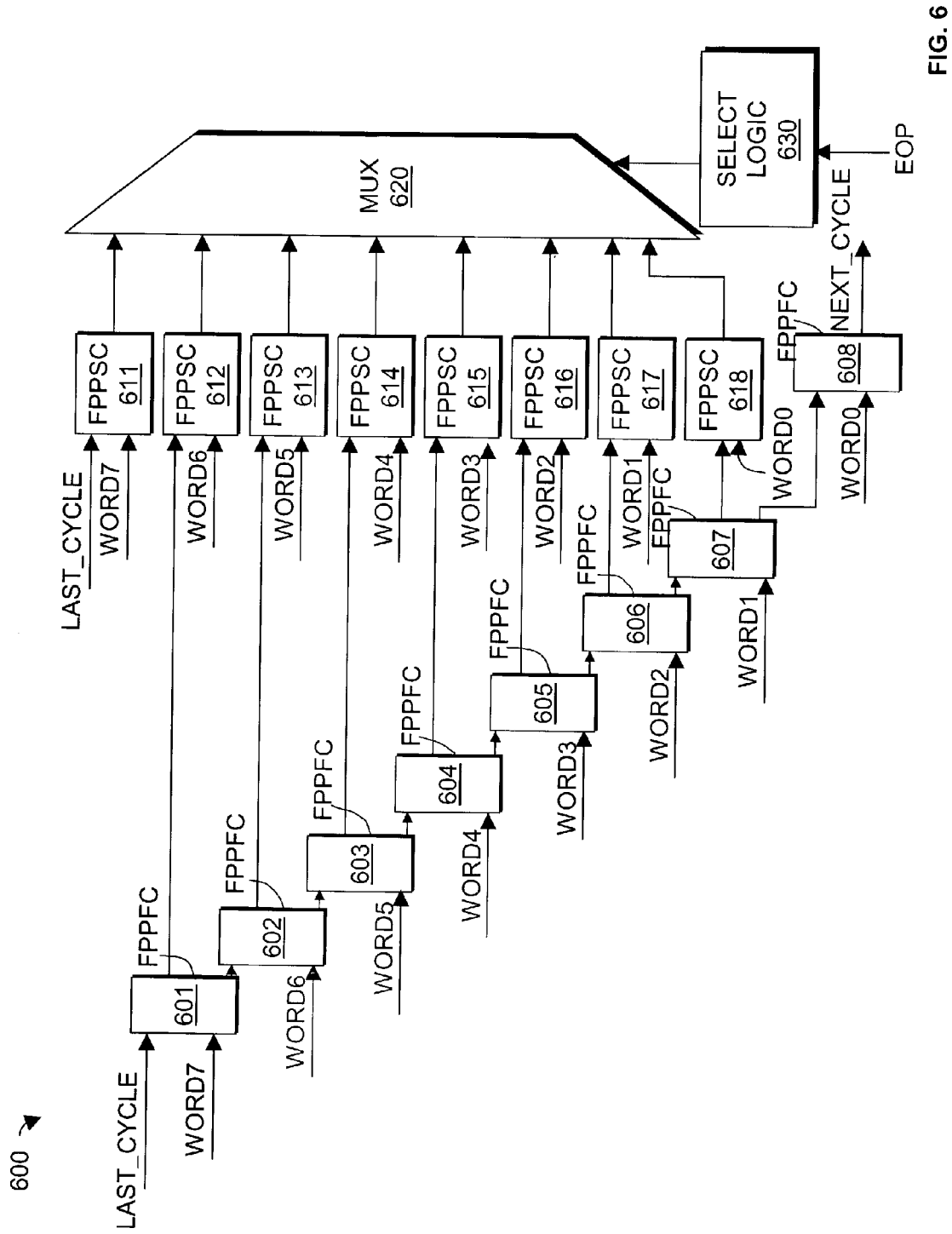
FIG. 6 is a block diagram of a first parity processor that may be used to implement the first parity processor shown in FIG. 4 according to an embodiment of the present invention.

FIG. 6 is a block diagram of a first parity processor 600 according to an embodiment of the present invention. The first parity processor 600 may be used to implement the first parity processor shown in FIG. 4. The first parity processor 600 includes a plurality of first parity processor first circuits (FPPFC) 601–608 coupled in series. The first parity processor first circuits 601–608 are assigned an order from lowest to highest, where the first parity processor first circuits 601–608 are assigned orders zero through seven, respectively. The first parity processor first circuits 601–608 generate first parity results from its inputs. Each of the first parity processor first circuits 601–608 receives a word from the current time cycle having a corresponding designated 0 order as a first input. Each of the first parity processor first circuits 601–608, with the exception of the first parity processor first circuit 601, receives an output from a previous first parity processor first circuit in series as a second input. The first parity processor first circuit 601 receives an output from the last first parity processor first circuit 608 generated at a previous time cycle as its second input. According to one embodiment, this value may be read from the register 340 (shown in FIG. 3). The highest order first parity processor circuit 608 generates a parity result that may be used by the first parity processor 600 during a next time cycle. This value may be written into the register 340.

The plurality of first parity processor first circuits 601–608 are coupled such that each generates a first parity result from the first data word in the first packet of data through the current word received by the first parity processor first circuit. According to an embodiment of the present invention, each of the first parity processor first circuits 601–608 may be implemented by a circuit that performs XOR operations.

The first parity processor 600 includes a plurality of first parity processor second circuits 611–618. Each of the first parity processor second circuits 611–618 is assigned an order from lowest to highest, where the first parity processors second circuits 611–618 are assigned orders zero through seven, respectively. Each of the plurality of first parity processor second circuits 611–618 corresponds to one of the first parity processor first circuits 601–608. The first parity processor second circuits 611–618 generate first parity sum values from its inputs. Each of the plurality of first parity processor second circuits 611–618 receives a word having a corresponding designated order as a first input. Each of the plurality of first parity processor second circuits 611–618 receives an output from a corresponding first parity processor first circuit 601–608 as a second input. The word having the corresponding designated order is a next word or word having a next relative order to the order of the corresponding first parity processor first circuit. In one embodiment, the lowest order first parity processor second circuit 611 corresponds to the highest order first parity processor first circuit 608. In this embodiment, the first parity processor second circuit 611 receives a first parity result generated from the first parity processor first circuit 608 during a previous time cycle. This first parity result may be read from the register 340.

The first parity processor second circuits 611–618 are coupled such that each generates a first parity sum value for the first packet of data where the corresponding word received by a first parity processor second circuit is assumed to be the payload control words associated with the last or final word of the first packet of data. According to an embodiment of the first parity processor 600, each of the parity processor second circuits 611–618 performs the operation of diagonally summing the payload control words with the diagonally summed data words of the first packet of data, and breaking and XORing the parity sums (as shown in FIG. 2) to generate the DIP-4 parity bits. According to an embodiment, each of the first parity processor second circuits 611–618 may be implemented by a circuit that performs XOR operations.

The first parity processor includes a multiplexer 620 and a select logic 630. The multiplexer 620 is coupled to and receives first parity sum values from each of the first parity processor second circuits 611–618. The select logic 630 is coupled to the multiplexer 620 and receives an EOP value from the control decode unit 310 (shown in FIG. 3). The select logic 630 selects a first parity sum value to be output and designated as the parity value or DIP-4 parity bit for the first packet in response to the EOP value.

Figure 7:
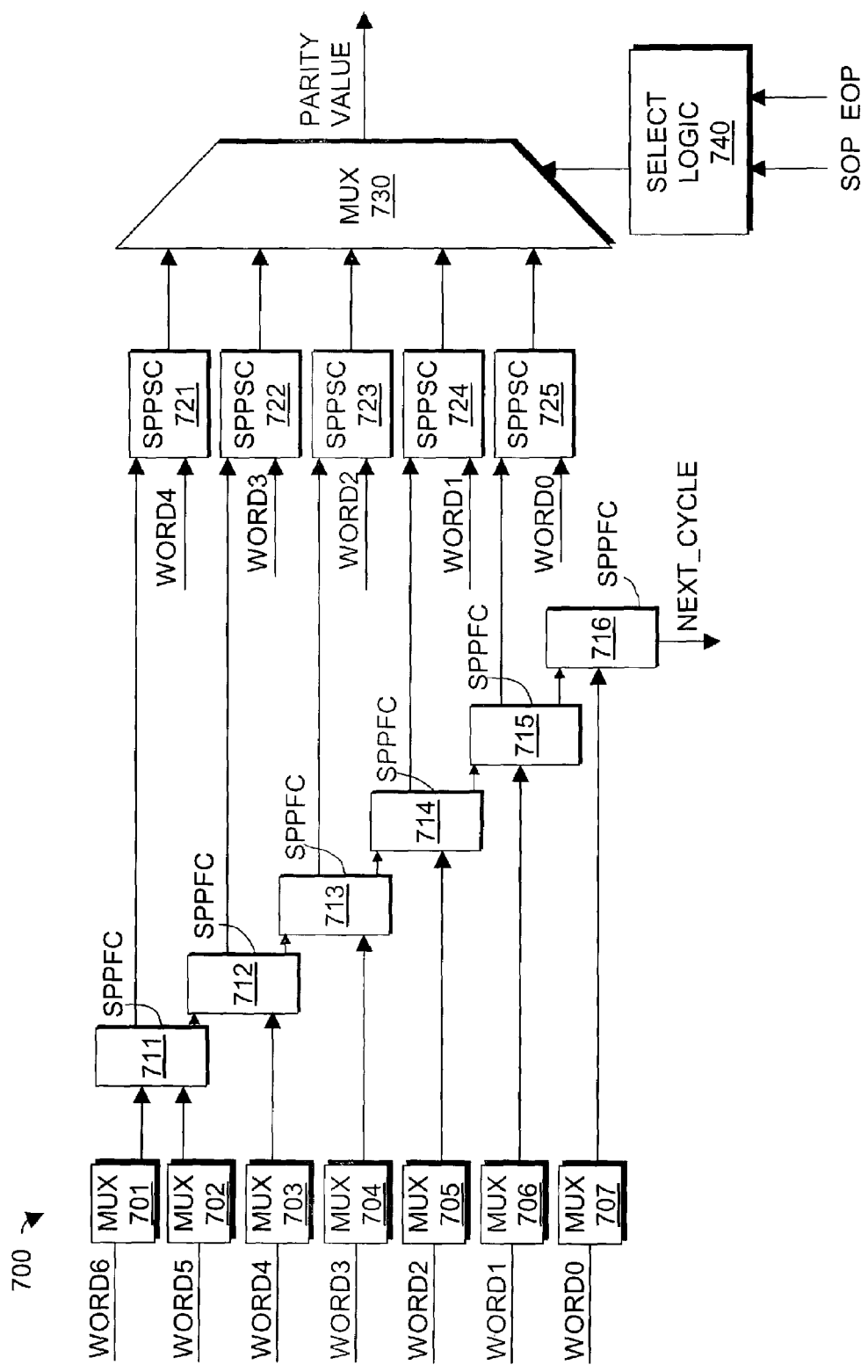
FIG. 7 is a block diagram of a second parity processor that may be used to implement the second parity processor shown in FIG. 5 according to an embodiment of the present invention.

FIG. 7 is a block diagram of a second parity processor 700 according to an embodiment of the present invention. The second parity processor 700 may be used to implement the second parity processor shown in FIG. 5. The second parity processor 700 includes a plurality of multiplexers 701–707. Each of the plurality of multiplexers receives a word received by the second parity processor 700 during the time cycle. Since the second parity processor 700 is used to compute parity sum values for a second packet of data received during the time cycle, at least one of the words in the time cycle corresponds to a first packet of data. Thus, the first word received during the time cycle need not be sent to any of the plurality of multiplexers 701–707.

The plurality of multipelxers 701–707 operate to calibrate the second parity processor 700 such that parity results generated only take into account words associated with the second packet of data. Because downstream components in the second parity processor 700 are connected such that second parity results are generated from inputs into the components, words associated with the first packet of data should be ignored. Each of the plurality of multiplexers 701–707 outputs either the word received or a zero value depending on whether the word is associated with the second packet of data. If a word is not associated with the second packet of data, its corresponding multiplexer outputs a zero value. The zero value will not affect the parity result calculations of the second parity processor 700.

The second parity processor 700 includes a plurality of second parity processor first circuits (SPPFC) 711–716 coupled in series. The second parity processor first circuits 711–716 are assigned an order from lowest to highest, where the first parity processor first circuits 711–716 are assigned orders zero through six, respectively. The second parity processor first circuits 711–716 generate second parity results from its inputs. Each of the second parity processor second circuits 711–716 receives an output from the plurality of multiplexers 701–707 as a first input. Each of the second parity processor first circuits 711–716, with the exception of the second parity processor first circuit 711, receives an output from a previous second parity processor first circuit in series as a second input. The second parity processor first circuit 711 receives as inputs outputs from the multiplexer 701 and 702.

The plurality of second parity processor first circuits 711–716 are coupled such that each generates a second parity result from the first data word in the second packet of data through the current data word received by the second parity processor first circuit. According to an embodiment of the present invention, each of the second parity processor first circuits 711–716 may be implemented by a circuit that performs XOR operations. The second parity result generated by the last second parity processor first circuit 716 may be used in the next time cycle to determine additional parity results. According to one embodiment, the second parity result generated by the last second parity processor first circuit 716 is written into the register 340 (shown in FIG. 3).

The second parity processor 700 includes a plurality of second parity processor second circuits 721–725. Each of the first parity processor second circuits 721–725 is assigned an order from lowest to highest, where the second parity processors second circuits 721–725 are assigned orders zero through four, respectively. Each of the plurality of second parity processor second circuits 721–725 corresponds to one of the second parity processor first circuits 711–715. The plurality of second parity processor second circuits 721–725 generate second parity sum values from its inputs. Each of the plurality of second parity processor second circuits 721–725 receives a word having three corresponding designated orders higher as a first input. Each of the plurality of second parity processor second circuits 721–725 receives an output from a corresponding second parity processor first circuit 721–725 of the same order as a second input.

The second parity processor second circuits 721–725 are coupled such that each generates a second parity sum value for the second packet of data where the input word is assumed to be the payload control words associated with the last word of the second packet of data. Each of the second parity processor second circuits 721–725 performs the operation of diagonally summing the payload control words with the diagonally summed data words of the second packet of data, and breaking and XORing the parity sums (as shown in FIG. 2) to generate the DIP-4 parity bits. According to an embodiment of the present invention, each of the second parity processor second circuits 721–725 may be implemented by a circuit that performs XOR operations.

The second parity processor 700 includes a multiplexer 730 and a select logic 740. The multiplexer 730 is coupled to and receives second parity sum values from each of the second parity processor second circuits 721–725. The select logic 740 is coupled to the multiplexer 730 and receives SOP and EOP values from the control decode unit 310 (shown in FIG. 3). The select logic 740 selects a parity sum value to be output and designated as the parity value or DIP-4 parity bit for the second packet in response to the EOP value. According to an embodiment of the second parity processor 700, the select logic 740 may be coupled to each of the multiplexers 701–707. In this embodiment, the select logic 740 may select the outputs of the multiplexers 701–707 in response to the SOP value.

It should be appreciated that the control decode unit 310 (shown in FIG. 3), first parity processor 320, 400, and 600, (shown in FIGS. 3, 4, and 6) second parity processor 330, 500, and 700 (shown in FIGS. 3, 4, and 6), and register 340 (shown in FIG. 3) may be implemented using any known technique or circuitry. According to an embodiment of the present invention, the control decode unit 310, first parity processor 320, 400, and 600, second parity processor 330, 500, and 700, and register 340 all reside on a single semiconductor substrate. In this embodiment, the components may be implemented using a programmable logic device or a field programmable logic array.

According to an alternate embodiment of the present invention, the methods described are performed in response to a processor executing sequences of instructions contained in a memory. Such instructions may be read into the memory, for example, from a computer-readable medium. It should be appreciated that, hard-wire circuitry may be used in place of or in combination with software instructions to implement the methods described. Thus, the present invention is not limited to any specific combination of hardware circuitry and software.

Figure 8:
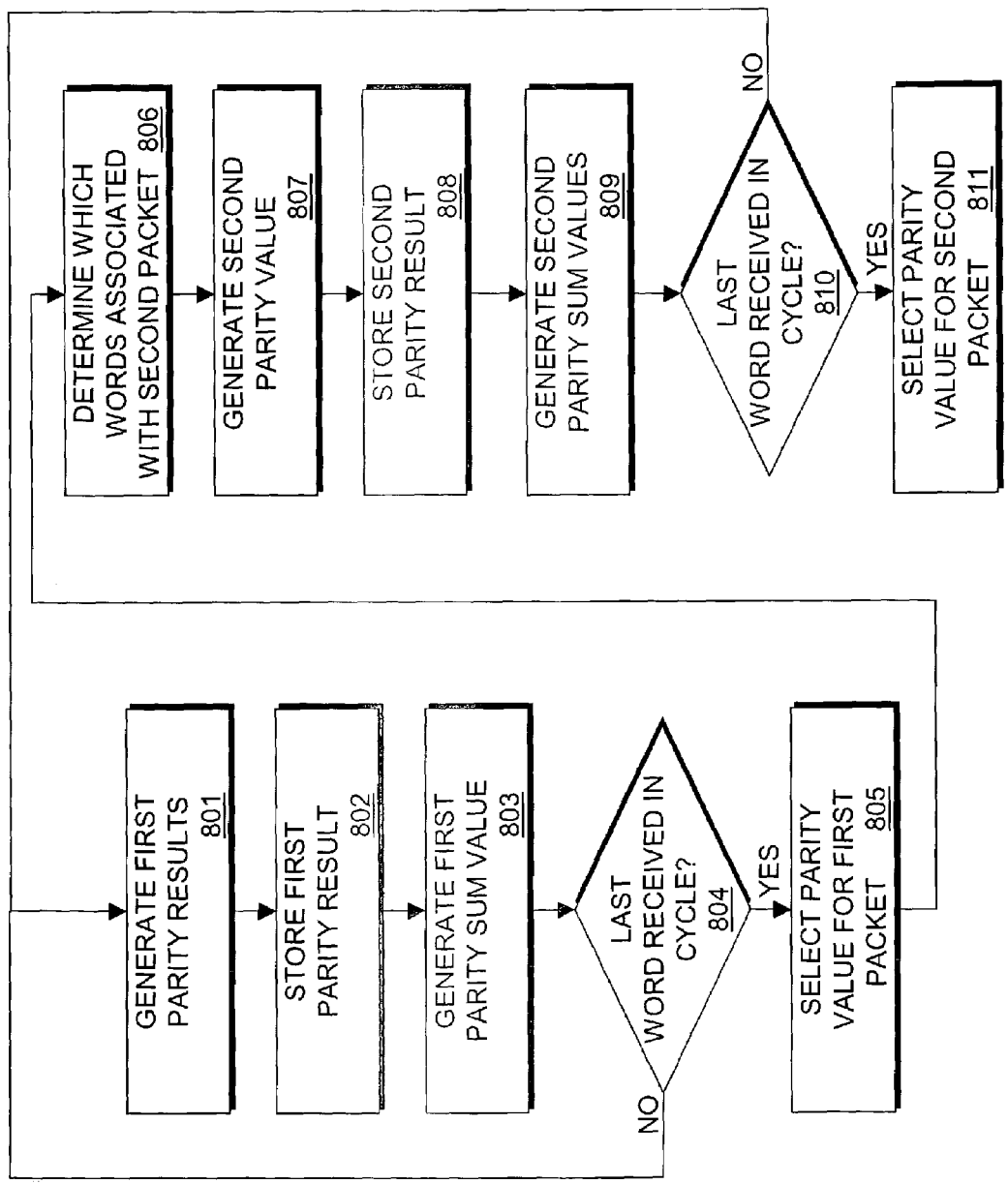
FIG. 8 is a flow chart illustrating a method for generating parity values according to an embodiment of the present invention.

FIG. 8 is a flow chart illustrating a method for generating parity values according to an embodiment of the present invention. At step 801, first parity results are generated. The first parity results are generated from words received during a cycle and previously generated parity result. The previously generated parity results may include a parity result generated from words received during the current cycle and a parity result generated from words received during a previous cycle. According to one embodiment, the first parity results are generated by diagonally summing the terms in the words.

At step 802, a first parity result corresponding to a last word received during the current cycle is stored.

At step 803, first parity sum values are generated from the first parity results and a corresponding next word. According to one embodiment, the first parity sum values are generated by performing an XOR function on a first parity result and a next word corresponding to the first parity result.

At step 804, it is determined whether a last word in the packet is among the words received during the cycle. If the last word in the packet was not received during the cycle, control returns to step 801. If the last word in the packet was received during the cycle, control proceeds to step 805. This may be achieved by reading an EOP value.

At step 805, one of the first parity sum values is selected as the parity value of the packet. This may be achieved by reading an EOP value.

At step 806, it is determine which if any of the words received during the cycle is associated with a second packet. This may be achieved by reading an SOP value.

At step 807, second parity results are generated. Words associated with the first packet are ignored for the purposes of generating the second parity results. The second parity results may be generated from words received during the cycle, zero values, and previously generated second parity results. The previously generated parity results may include a parity result generated from words received during the current cycle. According to one embodiment, the second parity results are generated by diagonally summing the terms in the words.

At step 808, a second parity result corresponding to a last word received during the current cycle is stored.

At step 809, second parity sum values are generated from the second parity results and a corresponding next word. According to one embodiment, the second parity sum values are generated by performing an XOR function on a second parity result and a next word corresponding to the second parity result.

At step 810, it is determined whether a last word in the second packet is among the words received during the cycle. If the last word in the second packet was not received during the cycle, control returns to step 801. If the last word in the second packet was received during the cycle, control proceeds to step 811. Determining whether a last word in the second packet was received during the cycle may be achieved by reading an EOP value.

At step 811, one of the second parity sum values is selected as the parity value of the second packet. This may be achieved by reading an EOP value.

FIG. 8 illustrates a flow chart describing a method for generating parity values. Some of the steps illustrated in this figure may be performed sequentially, in parallel or in an order other than that which is described. It should be appreciated that not all of the steps described are required to be performed, that additional steps may be added, and that some of the illustrated steps may be substituted with other steps.

FIG. 9 illustrates exemplary data and control transitions processed by a parity value processor according to an embodiment of the present invention. Among the words received during cycle 1, word7-word4 are associated with a first packet of data and word1-word10 are associated with a second packet of data. Referring to FIG. 6, the first parity processor second circuit 615 would generate a first parity sum value from the first parity result generated from first parity processor first circuit 603 and word4. The select logic 630 would select the first parity sum value from first parity processor second circuit 615 from the multiplexer 620 as the parity value in response to an EOP value. Referring to FIG. 7, multiplexers 701–705 would select zero values to be output to corresponding second parity processor first circuits 711–714. Second parity processor first circuit 716 would generate a second parity result that would be stored in register 340 (shown in FIG. 3).

Among the words received during cycle 2, word7-word1 are associated with the second packet of data, and word1-word10 are associated with a third packet of data. Referring to FIG. 6, the value stored in the register 340 would be read into first parity processor first circuit 601. The first parity processor second circuit 617 would generate a first parity sum value from the first parity result generated from first parity processor first circuit 606 and word1. The select logic 630 would select the first parity sum value from first parity processor second circuit 617 from the multiplexer 620 as the parity value in response to an EOP value. Referring to FIG. 7, multiplexers 701–706 would select zero values to be output to corresponding second parity processor first circuits 711–715. Second parity processor first circuit 716 would generate a second parity result that would be stored in register 340.

Among the words received during cycle 3, word7-word3 are associated with the third packet of data. Referring to FIG. 6, the value stored in the register 340 would be read into first parity processor first circuit 601. The first parity processor second circuit 615 would generate a first parity sum value from the first parity result generated from first parity processor first circuit 604 and word3. The select logic 630 would select the first parity sum value from first parity processor second circuit 615 from the multiplexer 620 as the parity value in response to an EOP value.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A circuit for computing parity values, comprising:
    a control decode unit that determines whether words received during a cycle correspond to more than one packet of data;
    a first parity processor that computes first parity sum values from first words associated with a first packet of data received during the cycle; and
    a second parity processor capable of computing second parity sum values from second words associated with a second packet of data received during the cycle when the control decode unit determines that the words correspond to more than one packet of data.

2. The apparatus of claim 1, further comprising a register capable of storing either a first parity result from the first parity processor when the first words do not include a final word of the first packet of data or a second parity result from the second parity processor when the second words do not include a final word of the second packet of data.

3. The apparatus of claim 1, wherein the first parity processor further computes a parity value for the first packet of data when the first words include a final word of the first packet of data.

4. The apparatus of claim 1, wherein the first parity processor includes a plurality of first parity processor first circuits coupled in series, each of the plurality of first parity processor first circuits generating a first parity result from a consecutive word received during the cycle and an output from a previous first parity processor first circuit in the series or a parity result from a previous cycle.

5. The apparatus of claim 4, wherein the first parity processor further includes a plurality of first parity processor second circuits, each corresponding to one of the plurality of first parity processor first circuits, each of the plurality of first parity processor second circuits generating a first parity sum value from a first parity result from a corresponding first circuit and a corresponding next word.

6. The apparatus of claim 5, wherein the first parity processor further includes a first selector that identifies one of the first parity sum values as the parity value of the first packet of data in response to a signal indicating which of the words represents an end of the first packet of data.

7. The apparatus of claim 1, wherein the second parity processor further computes a second parity value for the second packet of data from the second parity sum values when the second words include a final word of the second packet of data.

8. The apparatus of claim 1, wherein the second parity processor includes a plurality of multiplexers each receiving one of the words received during the cycle, each of the plurality of multiplexers outputting either the word received or a zero value in response to a signal indicating whether one of the words represents a start of a second packet.

9. The apparatus of claim 8, wherein the second parity processor further includes a plurality of second parity processor first circuits coupled in series, each of the plurality of second parity processor first circuits coupled to one of the plurality of multiplexers and generating a second parity result from an output of a corresponding multiplexer and an output from a previous second parity processor first circuit in the series or an output of a second multiplexer.

10. The apparatus of claim 9, wherein the second parity processor further includes a plurality of second parity processor second circuits, each corresponding to one of the plurality of second parity processor first circuits, each of the plurality of second parity processor second circuits generating a second parity sum value from a second parity result from a corresponding first circuit and a corresponding next word of the corresponding first circuit.

11. The apparatus of claim 10, wherein the second parity processor further includes a second selector that identifies one of the second parity sum values as a parity value of the second packet of data in response to a signal indicating which of the words represents an end of the second packet of data.

12. A circuit for computing parity values, comprising:
a first parity processor that includes
 a first stage first parity processor that includes a plurality of first parity processor first circuits coupled in series, each of the plurality of first parity processor first circuits generating a first parity result from a consecutive word received during a cycle and an output from a previous first parity processor first circuit in the series or a parity result from a previous cycle,
 a second stage processor first parity processor that includes a plurality of first parity processor second circuits, each corresponding to one of the plurality of first parity processor first circuits, each of the plurality of first parity processor second circuits generating a first parity sum value from a first parity result from a corresponding first circuit and a corresponding next word, and
 a first selector that identifies one of the first parity sum values as the parity value of a first packet in response to a signal indicating which of the words represents an end of the first packet.

13. The apparatus of claim 12, wherein each of the plurality of first parity processor first circuits comprises a circuit that performs an XOR operation.

14. The apparatus of claim 12, wherein each of the plurality of first parity processor second circuits comprises circuitry that performs XOR operations.

15. The apparatus of claim 12, wherein the first selector comprises:
 a multiplexer that receives the first parity sum values from the plurality of first parity processor second circuits; and
 a select logic that selects a first parity sum value from a first parity processor second circuit that processes a control word that corresponds to the end of the first packet.

16. The apparatus of claim 12, further comprising a register capable of storing a first parity sum value from the first parity processor when the first words do not include a final word of the first packet.

17. The apparatus of claim 12, further comprising a second parity processor that includes:
 a plurality of multiplexers each receiving a word received during the cycle, each of the plurality of multiplexers outputting either the word received or a zero value in response to a signal indicating whether one of the words represents a start of a second packet;
 a first stage second parity processor that includes a plurality of second parity processor first circuits coupled in series, each of the plurality of second parity processor first circuits coupled to one of the plurality of multiplexers and generating a second parity result from an output of a corresponding multiplexer and an output from a previous second parity processor first circuit in the series or an output of a second multiplexer;
 a second stage processor second parity processor that includes a plurality of second parity processor second circuits, each corresponding to one of the plurality of second parity processor first circuits, each of the plurality of second parity processor second circuits generating a second parity sum value from a second parity result from a corresponding first circuit and a corresponding next word of the corresponding first circuit; and
 a second selector that identifies one of the second parity sum values as a parity value of a second packet in response to a signal indicating which of the words represents an end of the second packet.

18. A method for computing parity values, comprising:
generating first parity results from words received during a cycle and a previously generated parity result;
generating first parity sum values from the first parity results and a corresponding next word; and
identifying one of the first parity sum values as a parity value of a first packet in response to a signal indicating which of the words represents an end of the first packet.

19. The method of claim 18, further comprising storing a first parity result when the words received during the cycle do not include a final word of the first packet.

20. The method of claim 18, further comprising
generating second parity results from previously generated second parity results and words received during the cycle and/or zero values;
generating second parity sum values from the second parity result and a corresponding next word; and
identifying one of the second parity sum values as a parity value of a second packet in response to a signal indicating which of the words represents an end of the second packet.

21. The method of claim 20, further comprising storing a second parity result when the words received during the cycle do not include a final word of the second packet.

* * * * *